(12) United States Patent
Fukasawa

(10) Patent No.: US 8,239,956 B2
(45) Date of Patent: Aug. 7, 2012

(54) DOCUMENT OUTPUTTING APPARATUS, CONTROL METHOD THEREOF, AND DOCUMENT OUTPUT SYSTEM

(75) Inventor: Yusuke Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 893 days.

(21) Appl. No.: 12/167,528

(22) Filed: Jul. 3, 2008

(65) Prior Publication Data
US 2009/0024854 A1 Jan. 22, 2009

(30) Foreign Application Priority Data
Jul. 18, 2007 (JP) ................................. 2007-187601

(51) Int. Cl.
*G06F 21/00* (2006.01)

(52) U.S. Cl. .......................................... 726/26; 726/30

(58) Field of Classification Search .................... 380/51, 380/55; 726/26, 30, 31; 713/189, 193, 194
See application file for complete search history.

(56) References Cited

U.S. PATENT DOCUMENTS

| 6,772,342 B1 * | 8/2004 | Hawthorne ................... 713/176 |
| 2004/0125402 A1 | 7/2004 | Kanai et al. |
| 2006/0026150 A1 * | 2/2006 | Hamada ........................... 707/4 |

FOREIGN PATENT DOCUMENTS

| CN | 1713569 A | 12/2005 |
| JP | 2001-005728 | 1/2001 |
| JP | 2004-152261 | 5/2004 |
| JP | 2006-023821 | 1/2006 |

OTHER PUBLICATIONS

Chinese Office Action dated Feb. 12, 2010 concerning Chinese Patent Application No. 200810132500.5.

* cited by examiner

*Primary Examiner* — Edward Zee
(74) *Attorney, Agent, or Firm* — Fitzpatrick, Cella, Harper & Scinto

(57) ABSTRACT

A document providing computer creates a JDF file and a PDF file, and associates them by embedding a path to the PDF file in the JDF file (S000). When guaranteeing this combination, a hash calculation is performed for the JDF file, and the obtained hash value is embedded in the PDF file. The PDF file, except for the embedded hash value, is then encrypted using as a key the obtained hash value (S003). With a computer for printing the document, the PDF file is decrypted using the embedded hash value, and the hash value is re-calculated and compared with the embedded hash value, thus validating the correctness of the combination.

4 Claims, 11 Drawing Sheets

FIG. 10

```
<ResourcePool>
<RunList Class="Parameter" ID="IDRL-1" Status="Available" PartIDKeys="Run">
  <RunList Run="0">
    <LayoutElement>
      <FileSpec URL="input-1.pdf" HASH="35AB8DF53FC9029ADF7DC5197423" />
    </LayoutElement>
  </RunList>
</RunList>
:RunList Class="Parameter" ID="IDRL-2" Status="Available" PartIDKeys="Run">
  <RunList Run="0">
    <LayoutElement>
      <FileSpec URL="input-2.pdf" HASH="45CD34E53FC9029ADF7DC5197423" />
    </LayoutElement>
  </RunList>
</RunList>
/ResourcePool>
```

1001

1001a (HASH="35AB8DF53FC9029ADF7DC5197423")

1001b (HASH="45CD34E53FC9029ADF7DC5197423")

```
<JDF ID="J1"JobPartID="ID0"Type="Combined"Types="LayoutPreparation
  Imposition Interpreting Rendering DigitalPrinting"Activation="Active"
  Status="Ready"Version="1.2"Category="DigitalPrinting"
  ICSVersions="IDP-L1-1.0 Base-L1-1.0"MaxVersion="1.2"
  xmlns="http://www.CIP4.org/JDFSchema-1-1"
  xmlns:cj="http://www.canon.com/ns/CanonJDF"DescripitiveName="JDF-01"
  JobID="iWPM-JOB"HashByteRange= "0 215 220 285 286 298" >
                                        ⌇
  ...                                  1101
  <ResourcePool>
    ...
    <DigitalPrintingParams Class="Parameter"ID="IDDPP"Status="Available"
      Collate= "Sheet" >  ─1102
      <MediaRef rRef="RES-000"/>
    </DigitalPrintingParams>
  </ResourcePool>
  <ResourceLinkPool>
    ...
    <ComponentLink rRef="IDC"Usage="Output"CombinedProcessIndex="4"
      Amount= "3" />  ─1103
  </ResourceLinkPool>
  ...
</JDF>
```

DOCUMENT OUTPUTTING APPARATUS, CONTROL METHOD THEREOF, AND DOCUMENT OUTPUT SYSTEM

BACKGROUND OF THE INVENTION

1. Field of the Invention

The present invention relates to a document output apparatus, a control method thereof, and a document output system for combining print setting data and digital document data, and guaranteeing printing results. Additionally, the present invention relates to a technology for allowing changes of part of print setting data along with guaranteeing combination of print setting data and digital document data.

2. Description of the Related Art

Conventionally, there have existed technologies for printing PDF and other formats of digital document files using print settings (print format) specified separately. To this end, a digital document file to be printed and a print setting file are combined and subjected to a printing process. A technology related to combining print setting files and digital document data and guaranteeing printing results has been realized by obtaining printing conditions associated with digital documents from an access control server over a network (Japanese Patent Laid-Open No. 2004-152261). Another technology exists which prints by sending print data from a client to a print data generation server, judging from print data request information whether or not printing to the desired printing apparatus is permitted, and returning the print data to the client (Japanese Patent Laid-Open No. 2006-23821). There exists a technology for guaranteeing combination of two or more files which saves attributes information related to digital documents such as alteration detection information to a storage portion as a separate file, and does not guarantee authenticity if even a part of the digital document has been altered (Japanese Patent Laid-Open No. 2001-005728).

However, Japanese Patent Laid-Open No. 2004-152261 suffers from the problem of inconvenience since it requires using an access control server, which limits the environment of use. Similarly, Japanese Patent Laid-Open No. 2006-23821 suffers from the problem of inconvenience since it requires using a server such as a print data generation server, which limits the environment of use. Further, Japanese Patent Laid-Open No. 2001-005728 saves information for detecting alterations in a storage portion as a separate file. Therefore, the fact that portability is adversely affected and the fact that combinations of digital document groups are not guaranteed if even part of a digital document has been altered entail the problem that use is difficult in systems which allow changing parts of digital documents.

SUMMARY OF THE INVENTION

The present invention has been devised in light of these conventional examples, and has as its object to solve these problems. Namely, a document output apparatus, control method thereof, and document output system are provided with which a recipient of data can validate the association between document data and print setting data defining the print format thereof without a server, and with which the settings of part of the print setting data can be changed.

In order to solve these problems, the present invention comprises the following constitution. The present invention is a document output apparatus capable of outputting digital document data and print setting data defining print settings for the digital document data, associated one with the other, comprising a calculating unit configured to calculate a hash value for either digital document data or print setting data of a set of digital document data and print setting data, and an embedding unit configured to embed the hash value in the other data that is not used for the hash calculation by the calculating unit.

Another aspect of the present invention is a document output apparatus capable of outputting digital document data according to print setting data corresponding to the digital document data, comprising a calculating unit configured to calculate a hash value for either digital document data or print setting data of a set of digital document data and print setting data, a comparing unit configured to compare a hash value embedded in the other data not used for hash value calculation of the set of digital document data and print setting data, with the hash value calculated by the calculating unit, and a unit configured to generate print data based on the digital document data and the print setting data if the hash values compared by the comparing unit match.

With the present invention, the sending side can guarantee combinations of print setting data and digital document data to the receiving side, thus making it possible to prevent outputting printed matter unintended by the creator. It is further possible to prevent outputting print setting data and digital document data in improper combinations to systems lacking functionality for validating combinations of print setting data and digital document data, by encrypting digital document data using keys generated based on the print setting data. It is further possible to provide a mechanism for guaranteeing combinations of print setting data and digital document data while permitting partial modification of print setting data.

Further features of the present invention will become apparent from the following description of exemplary embodiments with reference to the attached drawings.

BRIEF DESCRIPTION OF THE DRAWINGS

FIG. 10 is a view showing an embedding location of a hash calculation range of a JDF file in a JDF file.

FIG. 11 is a view showing an embedding location of a hash calculation range of a JDF file in a JDF file.

DESCRIPTION OF THE EMBODIMENTS

<Process Overview>

Figure 1:
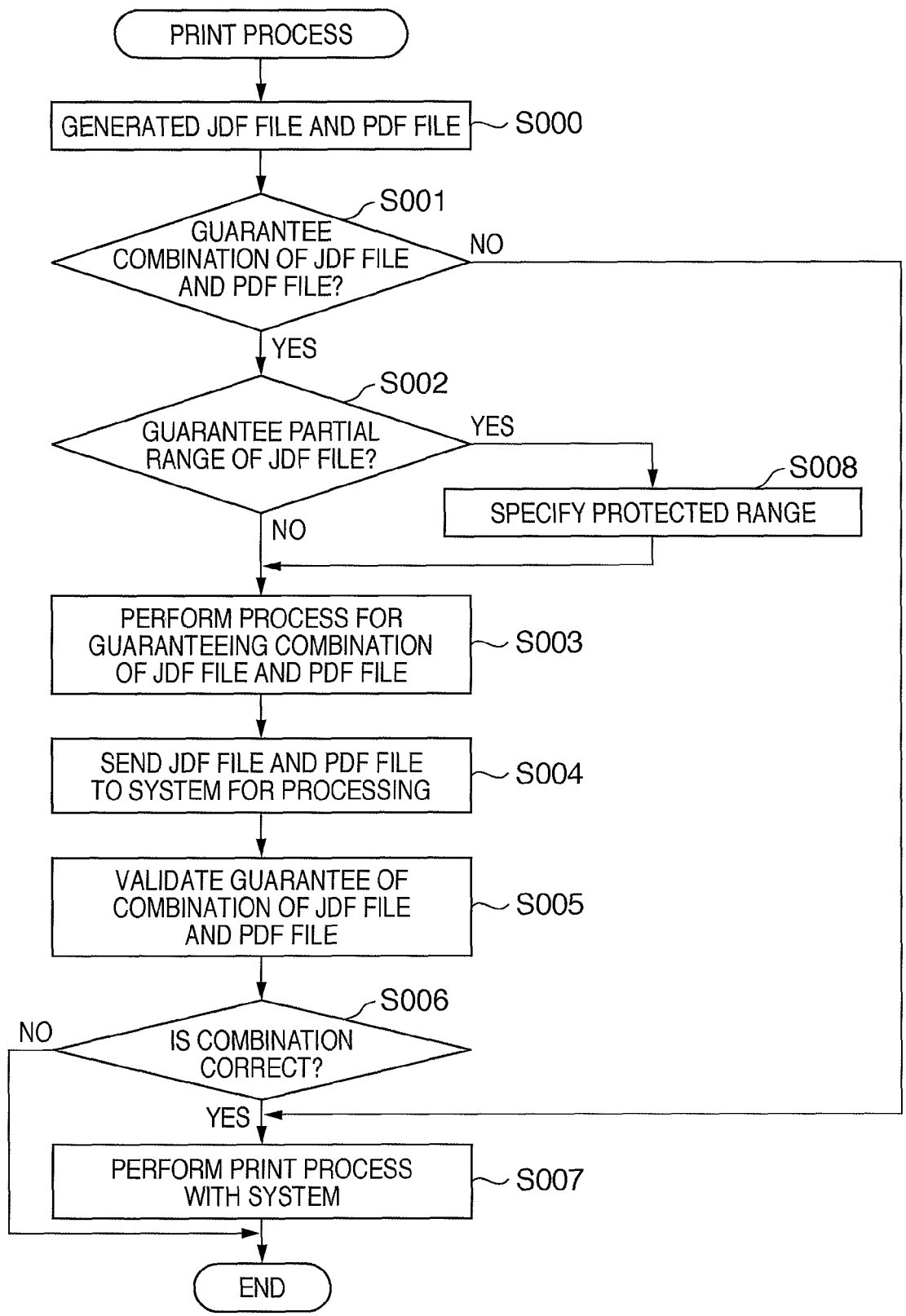
FIG. 1 is a typical flowchart for describing a digital document processing system according to the present invention.

First, an outline of a process according to the present embodiment is described. A document processing apparatus (or a document output apparatus) of the present embodiment outputs digital document data and print setting data defining print settings of the digital document data, in association with each other. When doing this, a hash value is calculated by performing hash calculation for either the digital document data or the print setting data. The hash calculation is performed sometimes for the digital document data and sometimes for the print setting data, and when it is performed for the print setting data, it is performed only for a part thereof. The obtained hash value is embedded in the other data for which the hash calculation was not performed. The hash value thus embedded is compared with a hash value recalculated from the data, thus making it possible to validate whether the pair of the digital document data and the print setting data is the same as the original pair.

By performing hash calculation for parts of the data excluding, for example, settings parameters designating the presence or absence of sorting and settings parameters designating the number of copies, the excluded parts can be changed. This is because even if the excluded parts are changed, the hash values calculated for data before and after the change are the same.

Digital document data is encrypted using the hash value obtained from the print setting data as a key. If hash calculation has already been performed using the print setting data as described above, the hash value thus obtained can be used as the encryption key. However, if the hash calculation is performed using the digital document data, a second hash value is calculated by performing a second hash calculation using the print setting data. The second hash value becomes the key for encrypting the digital document data.

On the other hand, the document output apparatus or printing apparatus receiving the pair of the digital document data and the print setting data in which the hash value is embedded can output the digital document data if the pair is the same as the original. Accordingly, first, a hash value is calculated by performing a hash calculation for either one of a set of digital document data and print setting data associated with one another. The position for which calculation is performed is either determined in advance, or is embedded in the data as subject location information. The hash value embedded in the other data for which hash calculation was not performed is then compared with a hash value obtained through calculation. If both hash values match, the pair of the digital document data and the print setting data are the pair set by the sending side, and the print data is generated based on this data. In a case in which the digital document data is encrypted, the document data is decrypted by, if there is a hash value calculated for the print setting data, using that value as the key. Otherwise, the document data is decrypted by calculating a hash value calculated for the print setting data, and using that value as a key.

An overview of the present embodiment is as above. Next, a detailed description is given. First, an example is described in which a hash value is calculated using print setting data and is embedded in digital document data, and then an example is described in which a hash value is calculated using digital document data and is embedded in print setting data.

First Embodiment

A first embodiment according to the present invention is described with reference to the drawings. Note that the description is of an embodiment in which the print setting data is a JDF (job definition format) file, and the digital document data is a PDF (portable document format) file. Note, however, that the present invention can be applied to other structured digital documents, such as XPS (XML paper specification) and SVG (scaleable vector graphic) files, as the digital document data.

<Hardware Configuration Example of a Document Processing System of the Present Embodiment>

Figure 12:
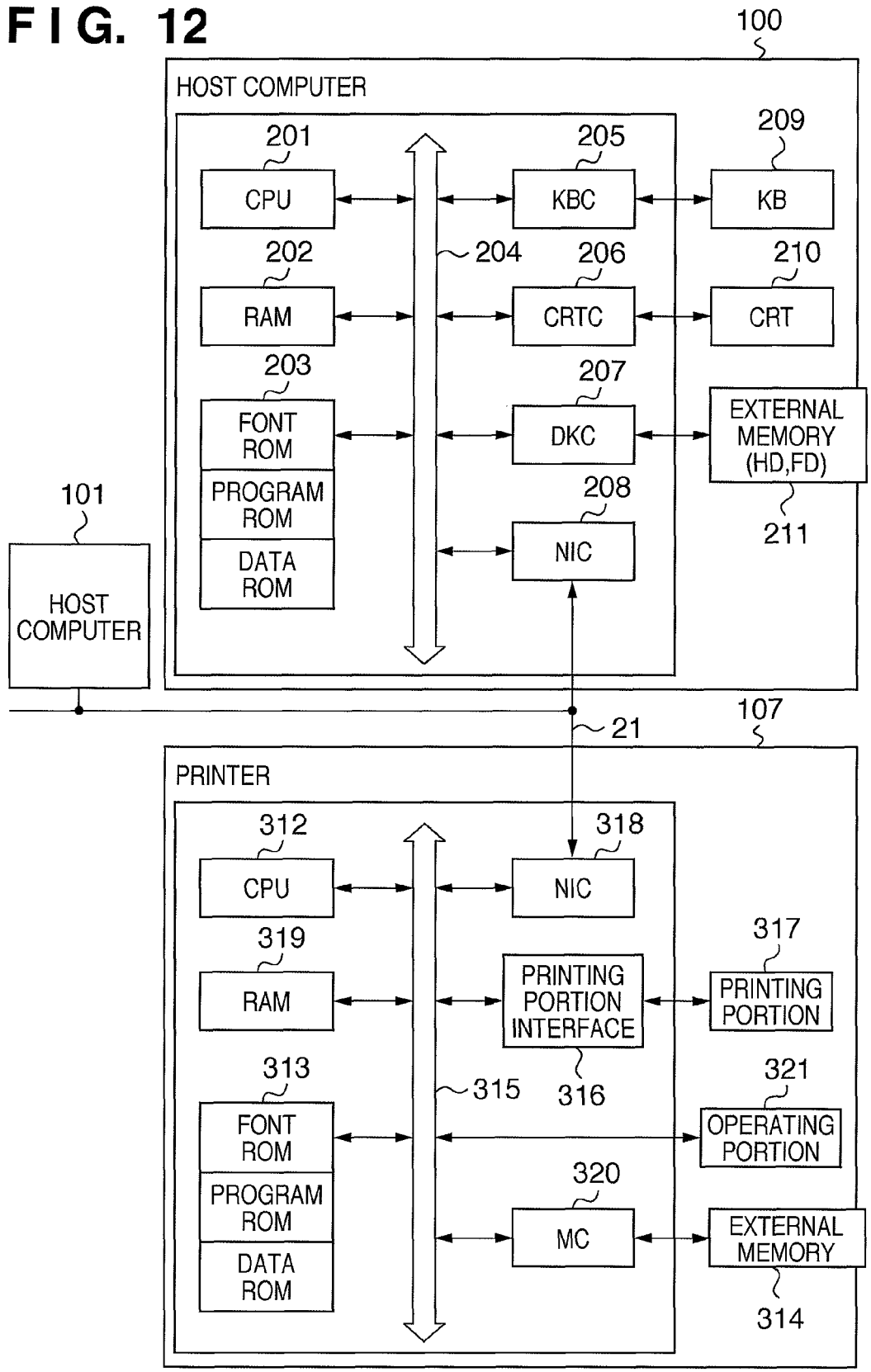
FIG. 12 is a block diagram of a computer and multi-functional peripherals for executing a process of an embodiment.

First, a configuration of apparatuses according to the present embodiment is described with reference to FIG. 12. FIG. 12 is a block diagram for describing a configuration of a document processing system of the present embodiment. Note that as long as functionality of the present invention is executed, the present invention is applicable as a single device, as a system made up of a plurality of devices, or as a system in which processing is performed connected via a LAN, WAN, or other type of network.

In FIG. 12, the host computer 100 comprises a CPU 201, a RAM 202, a ROM 203, and so on. The CPU 201 performs document processing based on a document processing program, etc., stored in a program ROM or an external memory 211. The document processing includes a procedure for creating data for validating the correctness of a combination of digital document data and print setting data, and a procedure for validating correctness, described below. Further, the CPU 201 performs overall control of all devices connected to a system bus 204. Further, the external memory 211 stores an operating system program (hereafter, "OS"), which is the control program for the CPU 201, and the like. Various types of data used during the document processing, etc., are stored in a data ROM area or the external memory 211. The RAM 202 functions as a main memory, work area, and so on for the CPU 201.

A keyboard controller (KBC) 205 controls key entry from a keyboard 209 and a pointing device not shown. A CRT controller (CRTC) 206 controls display of a CRT display (CRT) 210. A disk controller (DKC) 207 controls access to the external memory 211 in the form of a hard disk (HD), a Floppy™ disk (FD), or the like. An external memory 111 stores a boot program, various applications, font data, user files, editing files, a printer control command generating program (hereafter, "printer driver"), and the like. Digital document data and print setting data (corresponding to the PDF file and the JDF file) according to the present embodiment are also stored. An NIC (network interface card) 208 is connected to a printer 107 via a communication network 21 such as a LAN and executes a communication control process with the printer 107.

Moreover, the CPU 201 executes a rasterizing process for outline fonts to a display information RAM which is set, for example, in the RAM 202, making WYSIWYG possible in the CRT 210. The CPU 201 opens various windows in the CRT 210 based on commands indicated by a mouse cursor, etc., which is not shown in the drawings, thereby executing various data processes. When the user executes printing, a window relating to print settings provided by the printer driver opens, allowing setting of the printer and setting of a print processing method to the printer driver, including selection of printing mode.

The printer 107 is controlled by a CPU 312. The printer CPU 312 outputs an image signal as output information to a printing portion (printer engine) 317 connected to a system bus 315 via a printing portion interface 316 based on a control program, etc., stored in the program ROM area or a control program, etc., stored in the external memory 314. The program ROM area of this ROM 313 stores a control program, etc., of the CPU 312. Font data, etc., for use when generating the output information, is stored in a front ROM area of the ROM 313. A data ROM area of the ROM 313 stores information used by the host computer, in the case of a printer with no external memory 314 such as a hard disk.

The CPU 312 can communicate with the host computer via an NIC 318, and can pass information inside the printer, etc., to the host computer 100. A RAM 319 is a RAM which functions as the main memory, a work area, etc., of CPU 312, and is constituted such that its memory capacity can be expanded by optional RAM connected to extra ports which are not shown in the drawings. Moreover, the RAM 319 is used as an output information rasterizing area, an environment data storing area, NVRAM, and so on. Access to the external memory 314, such as a hard disk (HD), an IC card, or the like, discussed above, is controlled by a memory controller (MC) 320. The external memory 314 is connected optionally, and stores font data, emulation programs, form data, and the like. Further, 318 is the control panel described above, and switches, LED display devices, and the like for operation are disposed thereto.

The external memory 314 is not limited to one, but may be provided in a plurality, and can be configured such that a plurality of external memories may be connected, storing programs for interpreting option cards and different printer control languages, in addition to the built-in fonts. Moreover, an NVRAM which is not shown may also be provided for storing printer mode setting information from an operating portion 321.

A host computer 101 is a computer having the same constitution as the host computer 100. In the present embodiment, the host computer provides digital document data and print setting data corresponding to that digital document data to computers or multi-functional peripherals connected over a network as print job files. When a host computer or multi-functional peripheral specifies and gives the instruction for downloading of a print job file, it receives that print job file. It then validates whether or not the digital document data and the print setting data are the original combination, and if they are (i.e., if the combination is correct), the digital document data can be printed.

<Process Flow>

Next, an outline of the process flow according to the present embodiment is described with reference mainly to FIG. 1, after which a detailed description is of each process is given, with reference to other drawings.

In the process of S000 in FIG. 1, a JDF file is created based on information of print settings made in advance with respect to a PDF file, which is digital document data generated by, for example, a bookbinding application. A JDF (job definition format) file is print setting data for saving print settings, and is written in XML. A JDF is written using tags defined in name spaces which are determined in advance. In the present embodiment, in addition to the tags which are ordinarily used, a tag indicating a hash calculation range and a tag indicating a hash value are added. Using these tags, a hash calculation range and a hash value obtained by a hash calculation are written to the JDF file. The print settings ordinarily defined by a JDF include, for example, settings parameters for sorting of output sheets, and settings parameters for the number of copies to be printed. Path information for specifying a corresponding PDF file is also written to the generated JDF file. This information is called a "content path."

Figures 7, 8:
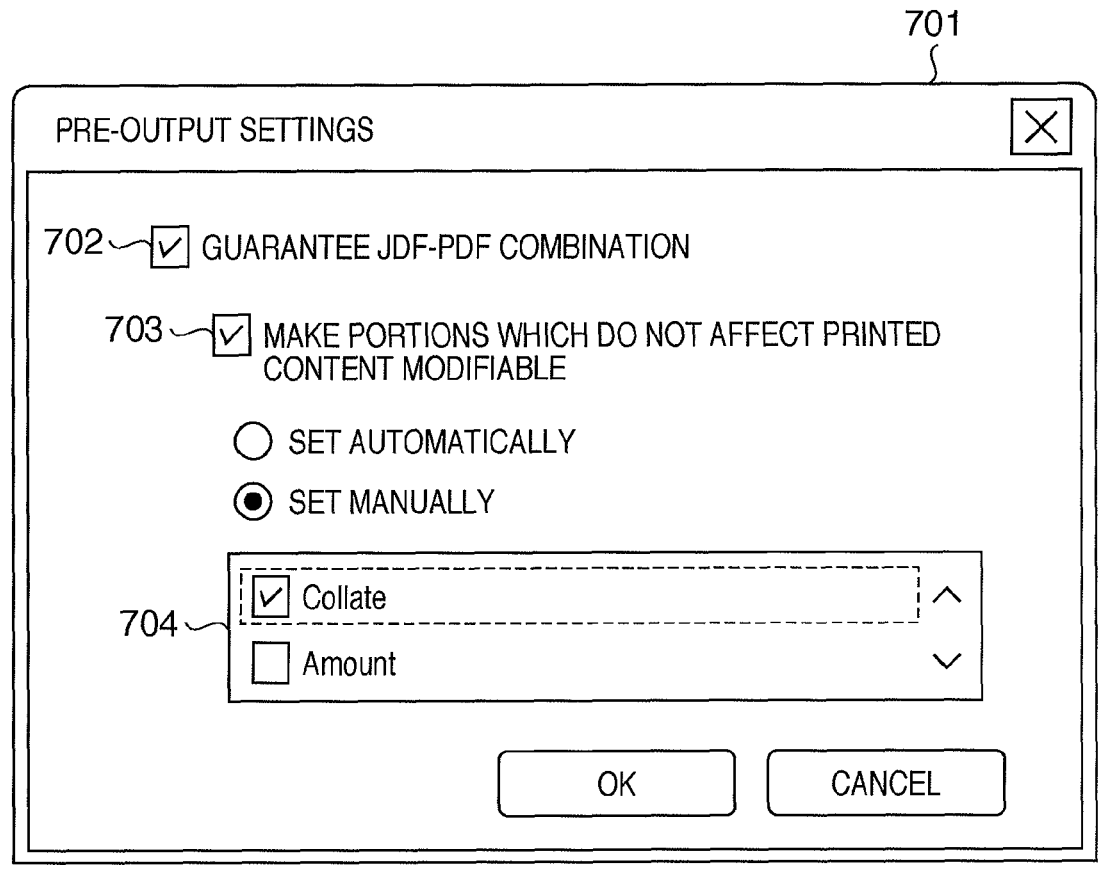
FIG. 7 is a dialog box for setting whether or not to guarantee a combination of a JDF file and a PDF file.
FIG. 8 is a list of attributes for making modifiable a portion which does not affect printed content.

Note that when outputting the generated JDF file and the PDF file, the dialogue in FIG. 7 is displayed. The user can make pre-output settings via this dialogue 701. FIG. 7 is a dialog 701 for setting whether or not to guarantee a combination of a JDF file and a PDF file. If it is desired to guarantee the combination of the JDF file and the PDF file, a check box 702 [Guarantee JDF-PDF combination] is checked. Next, if a portion which does not affect the printed content is desired to be made modifiable, a check box 703 [Make portions which do not affect printed content modifiable] is checked. In this case, it is possible to select whether various attributes inside the JDF which do not affect the printed output should be selected automatically or manually. Note that "attributes" are setting items in the print settings. The values of these setting items are also sometimes called "attributes." Accordingly, when the word "attributes" is used in this specification, it is possible to replace that word with "setting items."

Attributes in JDF files which do not affect the printed content differ according to the use environment. For example, in a use environment, if printing must always be done with the paper type set to quality paper, the attribute (setting item) indicating the paper type cannot be changed, as this would be viewed as affecting the printed content. However, if, in another use environment, printing to any paper type is permitted, then the paper type can be viewed as an attribute which does not affected the printed content. Therefore, the list of attributes in the JDF file for which parts which do not affect printed content can be changed is desirably prepared by the user according to the environment of use.

If "automatic setting" is selected, a list, prepared in advance, of items which would not affected the printed content by being changed is read, and all the list items are set as items which can be changed. FIG. 8 shows an example of this. If "manual setting" is selected, a list of setting items which would not affect the printed content by being changed is displayed to a list box, and items are selected by the user explicitly placing checks in the check boxes of items therein. The pre-output settings designated in FIG. 8, or in other words the flags corresponding to the check boxes, and the list of times which can be changed, is saved to memory, etc., and is referenced later.

The process in S001 corresponds to a judgment as to whether or not check box 702 [Guarantee JDF-PDF combination] displayed in the dialog 701 is checked. If the combination is not to be guaranteed, the data is sent to the system for processing, and ordinary printing processes are performed. However, in this case, since no guarantee of the combination of the JDF file and the PDF file is made, the printed results are not guaranteed.

The process of S002 corresponds to a judgment as to whether or not check box 703 [Make portions which do not affect printed content modifiable] in the dialog 701 is checked. If it is not checked, all areas in the JDF file are deemed protected, and the process moves to S003. If, on the other hand, it is checked, then in S008 information specifying all candidates of unprotected items, in the case of automatic setting, and items selected from among candidates for unprotected items, in the case of manual setting, are saved temporarily as unprotected areas.

Next, in the process of S003, a process for guaranteeing the combination of the JDF file and the PDF file is performed, based on these settings. Details of the process are given later. The items of unprotected candidates specified in S008 are excluded from items for hash calculation (details follow later).

In the process of S004, once the process of S003 is finished, the JDF file and the PDF file, whose combination is guaranteed, are generated. The generated JDF file and PDF file are saved to a folder shared over the network as a single print job file. It is also possible to send the JDF file and the PDF file to the system which performs the processing. The process performed by the sending-side document output apparatus is thus completed. From S005 on, the process is performed by the receiving-side document output apparatus. The receiving-side document output apparatus may be, for example, a printing apparatus, and not a so-called computer.

In the process of S005, the receiving-side document output apparatus which receives the JDF file and the PDF file performs validation of the guarantee of the combination of the JDF file and the PDF file. Details of the process are given later.

In the process of S006, a judgment is made as to whether or not, as a result of the process of S005, the combination is correct. If the combination is correct, then in the process of S007, the system executes a printing process. If the combination is not the originally generated combination, then all processes are stopped. Note that the originally generated combination is a set of the JDF file and the PDF file output in S0004. An incorrect combination is, for example, a case in which a different file has been substituted for either of the original ones, or if the content thereof has been changed. However, changes to items selected as unprotected items in the JDF file are excluded.

Next, in the process for guaranteeing the combination of the JDF file and the PDF file, a guaranteeing method by signing the PDF file and a guaranteeing method by signing the JDF file are described.

<Signing the PDF File (First Case)>

Figure 2:
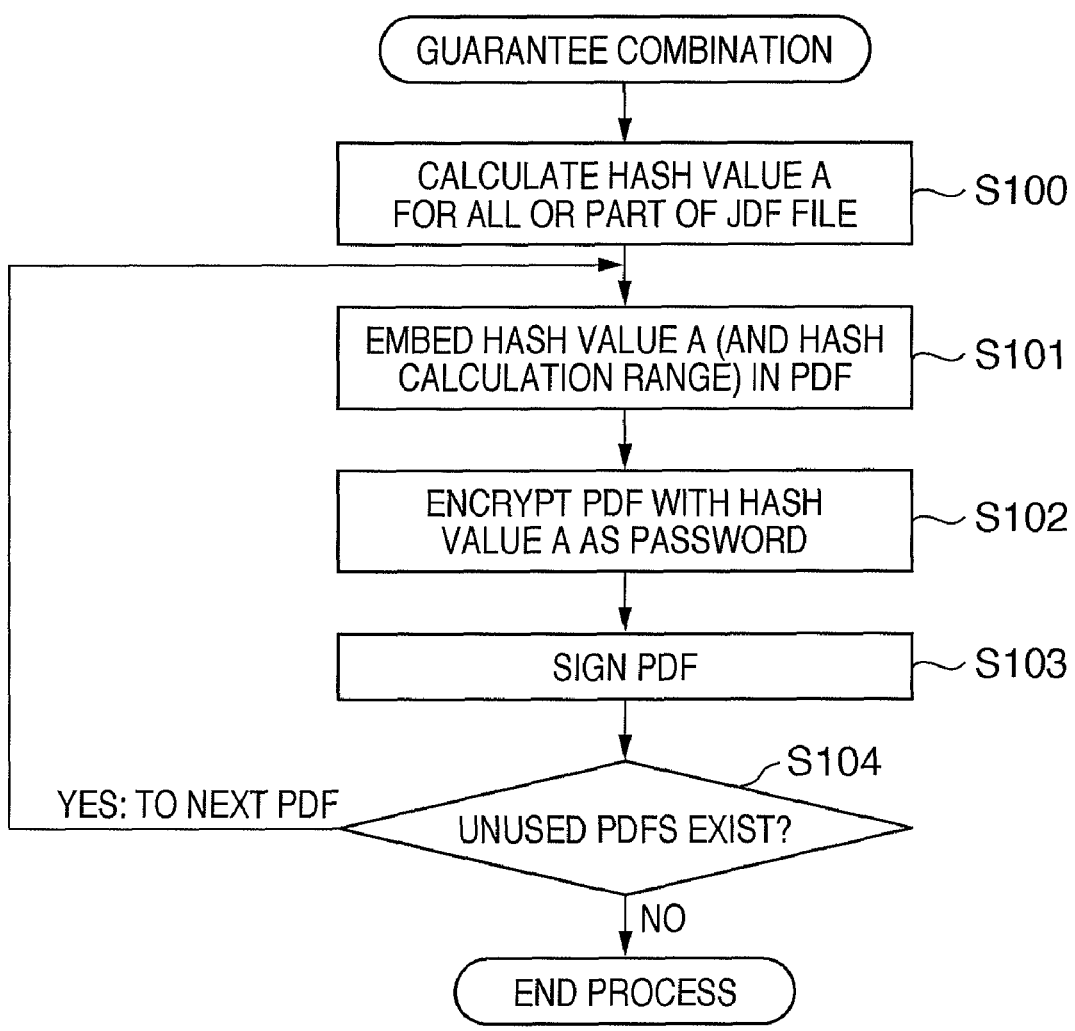
FIG. 2 is a flowchart for describing a method for guaranteeing a combination of JDF and PDF by signing a PDF.

Next, a method for guaranteeing the combination of the JDF file and the PDF file by signing the PDF file is described, with reference mainly to FIG. 2. FIG. 2 shows details of S003 in FIG. 1.

Figure 9:
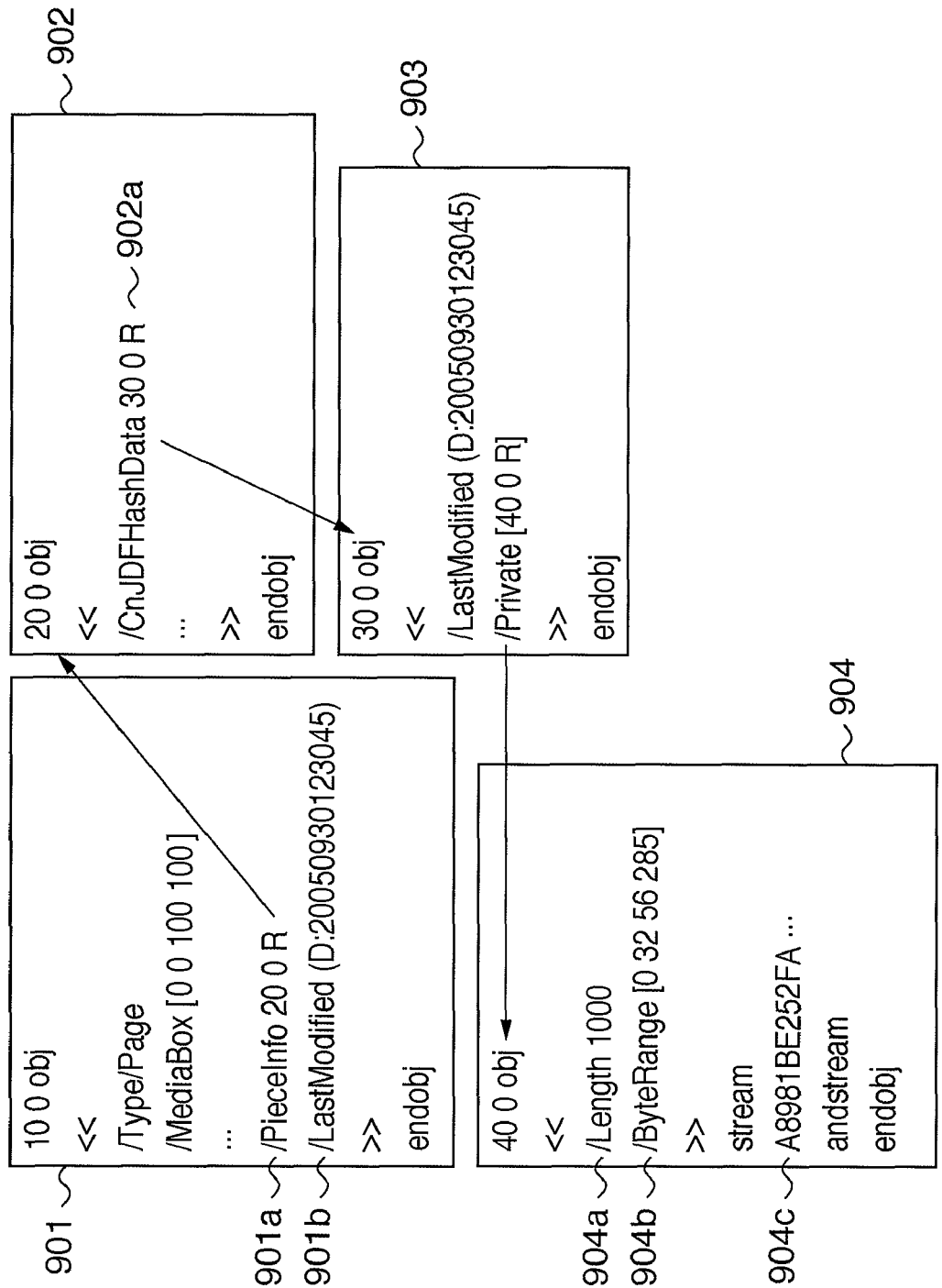
FIG. 9 is a view showing a hash value and an embedding location of a hash calculation range of a JDF file in a PDF file.

In the process of S100 in FIG. 2, a hash value A is calculated with respect to all or part of the JDF file according to settings in the dialog for setting whether or not to guarantee a combination of a JDF file and a PDF file. That is, S100 corresponds to a calculating means. Note that a specific description of determining the hash calculation range is given later. In the process of S101, the hash value A calculated in S100 and information of the hash calculation range are embedded in the PDF file. A specific embedding method is described below, with reference to FIG. 9. FIG. 9 gives an example of part of the structure of a PDF file. In FIG. 9, the PDF file has a layered structure made up of a page dictionary 901, a page piece dictionary 902, an application data dictionary 903, and a content stream dictionary 904.

When the hash value and the hash calculation range of a JDF file are embedded in a PDF file, a /PieceInfo entry 901a and a /LastModified entry 901b are added to the top page dictionary 901 in the PDF file. This is as shown in FIG. 9. As regards /PieceInfo, it is desirable to generate a separate page piece dictionary as an indirect object for reference. The page piece dictionary for the /PieceInfo entry thus generated is associated with the page dictionary by, for example, an ID of the entry. Further, as regards /LastModified, the time and date information of the point of time at which the entry was added is added according to the PDF time and date format. In order to add the hash value and the hash calculation range of the JDF file, a /CnJDFHashData entry 902a is further added to the page piece dictionary 902 of the /PieceInfo entry thus generated. An application data dictionary 903 for the /CnJDFHashData entry is generated in the same manner as the page piece dictionary. The same content as in the /LastModified entry is added to the application data dictionary 903, and a content stream dictionary 904 in which the hash value and hash calculation range are actually to be written is also added. A /Length entry 904a indicating the length of the hash value and a /ByteRange entry 904b indicating the hash calculation range are added to the content stream dictionary 904.

The value of the /ByteRange entry 904b is written in the PDF arrangement structure format, as a pair of the offset value and length. The offset value is the offset value from the top of the JDF file to just before the attribute values (setting items) outside the hash calculation range. The length is the length of the data in the range to which the hash is applied starting from the position indicated by the offset value. This pair is written in the number of sections to which the hash calculation range is applicable in the JDF file. Another method for writing the value of the /ByteRange entry 904b is a method for writing attribute names of attribute values outside the hash calculation range in the JDF file, such as writing the hash calculation range as /ByteRange [Collate Amount . . . ]. In this case, a range excluding the attribute values for the attribute names thus written becomes the hash calculation range, when performing validation of the guarantee of the combination of the JDF file and the PDF file discussed below. The hash value is embedded in section 904c in which stream data is written.

Next, in the process of S102, the PDF file is encrypted using the hash value calculated in S101. The method of encryption desirably complies with PDF specifications, and the location encrypted is character string information parts of the PDF file and stream data in the content stream dictionary. Accordingly, the /ByteRange entry 904b indicating the hash calculation range is not encrypted. Note that in the present embodiment, the encryption key is also called a "password" in accordance with PDF specifications.

In the process of S103, the PDF file is signed. The method of signing desirably complies with PDF specifications, and digital signature data is generated and embedded in the PDF file, in order to detect alteration of parts other than the digital signature data.

In the process of S104, if a plurality of PDF files references the JDF file, the process of S101 is returned to, and the same process as before is performed. In other words, hash values and hash calculation ranges are embedded in all the PDF files, and the PDF files are encrypted using the hash values as passwords. When processing of all the PDF files is finished, the process for guaranteeing the combination of the JDF file and the PDF files finishes.

<Determining the Hash Calculation Range of the JDF File>

Figure 6:
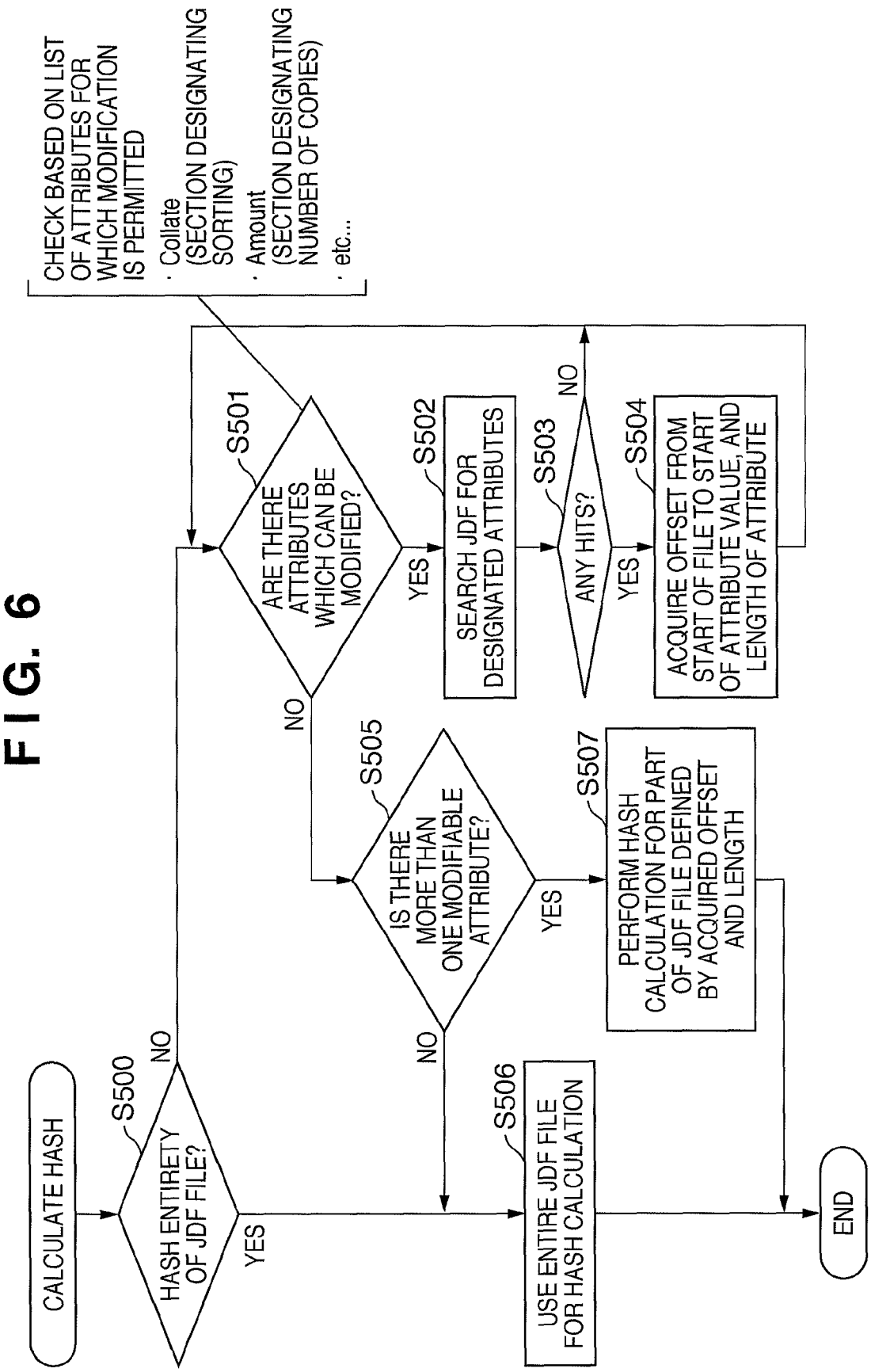
FIG. 6 is a flowchart for describing a method for determining a hash calculation range for a JDF file.

Next, a description is given of a method for calculating hash values in JDF files for hash calculation as S101 in FIG. 2, with reference to FIG. 6. FIG. 6 corresponds to the process in S100 of FIG. 2.

In the process of S500, a judgment is performed as to whether or not hash calculation should be performed for the entire JDF file, based on the settings in the dialog for setting whether or not to guarantee the combination of the JDF file and the PDF file in FIG. 7. In other words, if [Guarantee JDF-PDF combination] is set and [Make portions which do not affect printed content modifiable] is not set, hash calculation should be performed for the entire JDF file. If hash calculation should be performed for the entire JDF file, the process moves to the process in S506, the hash value for the entire JDF file is calculated, and the process ends. If hash calculation should not be performed for the entire JDF file, the process moves to the process in S501.

In the process of S501, a judgment is made as to whether an attribute (setting item) designated in the setting field 704 in the dialog in FIG. 7 is present. If a designated attribute is present, the process moves to the process in S502. In the example in FIG. 7, collate, or the sort attribute, is set as a modifiable attribute. The value set in user interface in FIG. 7 is saved after setting, so the saved setting is referenced by the processes in FIG. 6, etc.

In the process of S502, the attributes designated as modifiable attributes are searched for in the JDF file. If a plurality of attributes is designated, the search is performed focusing on one of them. The JDF file is written as a text file, and the attributes, or setting items, are shown as tags determined in advance, so it is easy to search for the tags indicating attributes in the JDF file. If the designated attribute is not included in the JDF file to be processed, or in other words, if there are no hits, then there is no way for that attribute to have been modified. Accordingly, the next attribute designated as modifiable is focused on, and the process from S501 is repeated.

On the other hand, if there is a hit, then in S504, regarding the searched-for attribute, the offset from the start of the JDF file to the start of the attribute, and the length of the description of the attribute are counted and stored temporarily in the memory. The offset and length may, for example, be the number of text characters. Since the setting items for which hash calculation is performed correspond to, for example, ranges enclosed by tags corresponding to those setting items, the range indicated by the offset and length is the range for which hash calculation is not performed. Note that if descriptions corresponding to a single attribute are present in many locations, those many locations are excluded from the locations for which hash calculation should be performed.

In S501, if no corresponding attribute values are present, or if searching has finished for all designated attributes, the process moves to the process of S505. In S505, a judgment is made as to whether or not one or more attributes designated as modifiable were found in the JDF file. If found, or in other words, if a range or ranges for which hash calculation should not be performed are found, the process of S507 is executed. If not, the process branches to S506. In other words, if not one corresponding attribute is present, the hash value is calculated by performing hash calculation for the entire JDF file, and the process ends.

In the process of S507, a hash value is calculated by performing hash calculation for portions of the JDF file, based on the offset from the start of the file to the start of the attributes and the length of the attributes stored temporarily in the memory. In other words, hash calculation is performed for all parts remaining after the hash exclusion areas determined by the offset from the start of the file and the length have been excluded from the JDF file. The hash calculation range and the hash value are temporarily saved. This value is embedded in the PDF file in the first embodiment. In the first and second embodiments, this hash value is used as the key for encrypting the PDF file.

Thus, a hash value is calculated using portions for which modification is not permitted, and the hash value, along with the ranges for which hash calculation is performed (or ranges for which hash calculation is not performed) are embedded in the PDF file. The PDF file is then encrypted using this hash value as a key. Note that the information obtained in S504 in FIG. 6 is information indicating sections for which hash calculation is not performed (called hash calculation ranges). Either ranges for which hash calculation is performed or ranges for which hash calculation is not performed may be embedded in the JDF file. This is because if one is specified, the other is also specified. In the present embodiment, the range for which hash calculation is not performed is converted into the hash calculation range, and embedded in the PDF.

Next, in the process for guaranteeing the combination of the JDF file and the PDF file, a method of validation when the PDF file is signed and a method of validation when the JDF file is signed are described.

<Validating When the PDF File is Signed>

Below, a method for validating the combination of the JDF file and the PDF file when the PDF file is signed is described, with reference mainly to FIG. 3.

Figure 3:
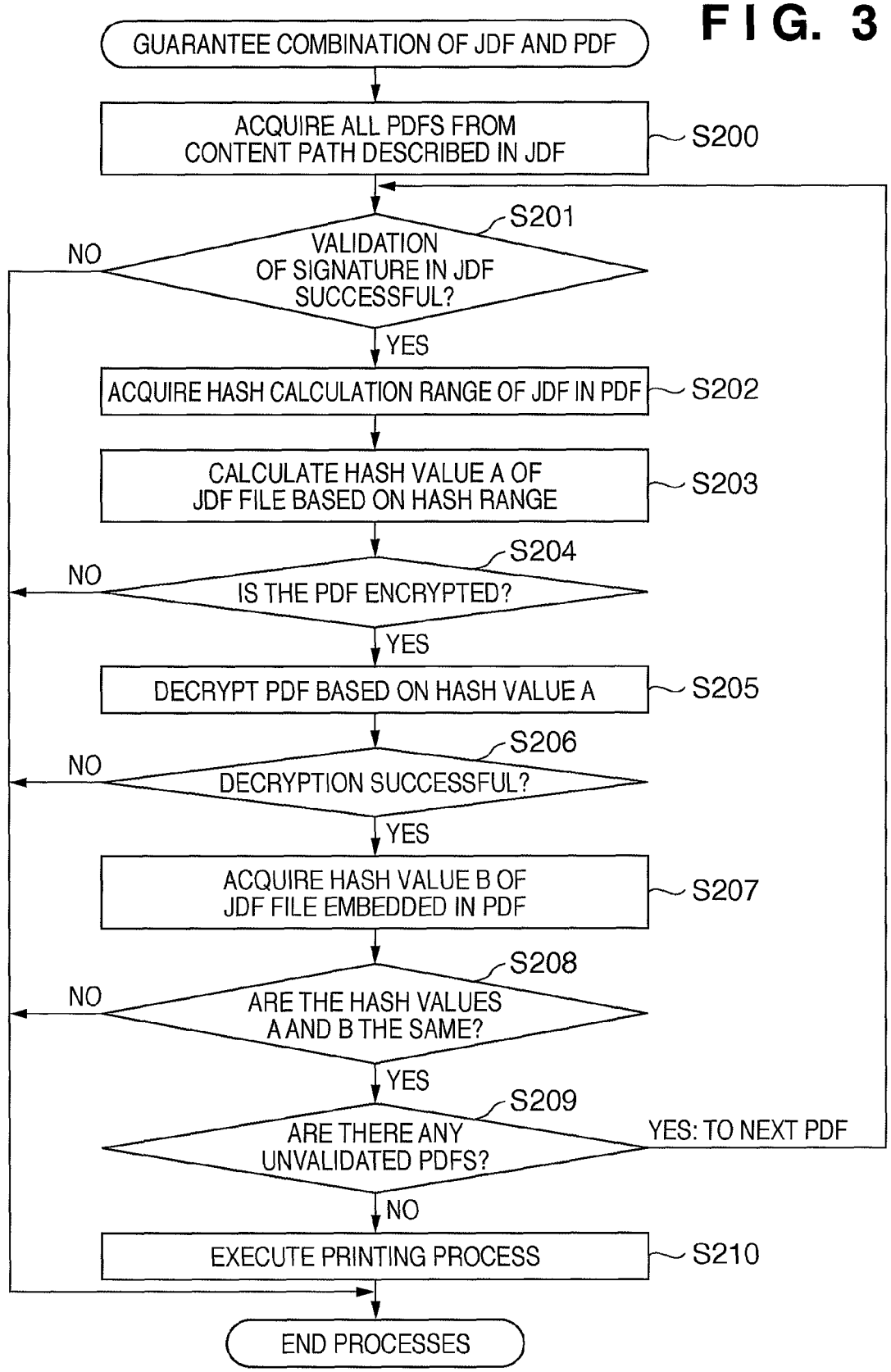
FIG. 3 is a flowchart for describing a validating method for guaranteeing a combination of a JDF file and a PDF file when the PDF file has been signed.

In the process of S200 in FIG. 3, all PDF files are acquired from the content paths described in the JDF file.

In the process of S201, a process for validating the signature of a PDF file is performed. Here, all that needs to be done is detecting alteration. The validating method complies with the PDF specifications. Namely, a hash value for the PDF file is calculated based on the value of the /ByteRange entry, which is the hash calculation range written to the signature dictionary in the PDF file. The hash value obtained by decrypting with the public key the digital signature embedded in the signature dictionary is compared with the above-described hash value, and if they match, it is deemed that no alternation has been performed. If they do not match, the process ends.

In the process of S202, the hash calculation range of the JDF file embedded in advance in the PDF file is acquired. The hash calculation range is written to a location embedded by the embedding process (S101 in FIG. 2). Specifically, as shown in FIG. 9, the page piece dictionary is referenced from the page dictionary in the PDF, the content stream dictionary is further referenced from the application data dictionary, and the hash calculation range embedded as the value of the /ByteRange entry is acquired.

In the process of S203, the hash value A of the JDF file is calculated based on the hash calculation range. Note that if the hash calculation range is written as an attribute name for which hash calculation is not performed in the JDF file, the hash value A of the JDF file is calculated for sections other than the attribute value for that attribute name.

In the process of S204, a determination is made as to whether or not the PDF file is encrypted. As a method, a determination is made as to whether or not an Encrypt dictionary is present in the PDF file. If the PDF file is encrypted, the process moves to the process in S205. If the PDF file is not encrypted, the process ends.

In the process of S205, the PDF file is decrypted using the hash value A calculated as described above. The method for decrypting the PDF file complies with the specifications of the PDF standard common key encryption method.

In the process of S206, a determination is made as to whether or not the decryption of S205 was successful, and if so, the process moves to the process of S207. If it was not successful, the process ends. Failure occurs when, for example, there is a mistake in the decryption key.

In S207, a hash value B for the JDF file embedded in the PDF file is acquired. The hash value B is written to a location embedded by the embedding process (S101 in FIG. 2) described above. Specifically, as shown in FIG. 9, the page piece dictionary is referenced from the page dictionary in the PDF, the content stream dictionary is further referenced from the application data dictionary, and the hash value B is acquired as the data in the stream.

In the process of S208, the hash value A calculated from the JDF file is compared with the hash value B of the JDF file embedded in the PDF file. If they match, the process moves to the process of S209. If they do not match, the process ends. This comparison corresponds to validating that the set of the PDF file and the JDF file are the original set, and corresponds to the comparing means.

In S209, if a plurality of PDF files are acquired in S200, the processes of S201, S202, S203, S204, S205, S206, S207, and S208 are performed on all the PDF files. Once the processes are finished for all the PDF files, a printing execution process is performed (S210), and the process ends.

With the above procedure, a hash value obtained for the JDF file is embedded in the PDF file, and that value is compared with a hash value re-calculated for the JDF file, thus making it possible to validate the set of files. Further, by encrypting the PDF file using the hash value as a password, it is possible to guarantee the set of the PDF file and the JDF file, even if a print job file has been downloaded by a multi-functional peripheral which cannot executed the validation procedure shown in FIG. 3.

Second Embodiment

With the present embodiment, a hash value is calculated for the PDF file, and is then embedded in the JDF file. Note, however, that the hash value acting as the password for encrypting the PDF file is calculated based on the JDF file, as in the first embodiment.

<Signing the JDF>

Figure 4:
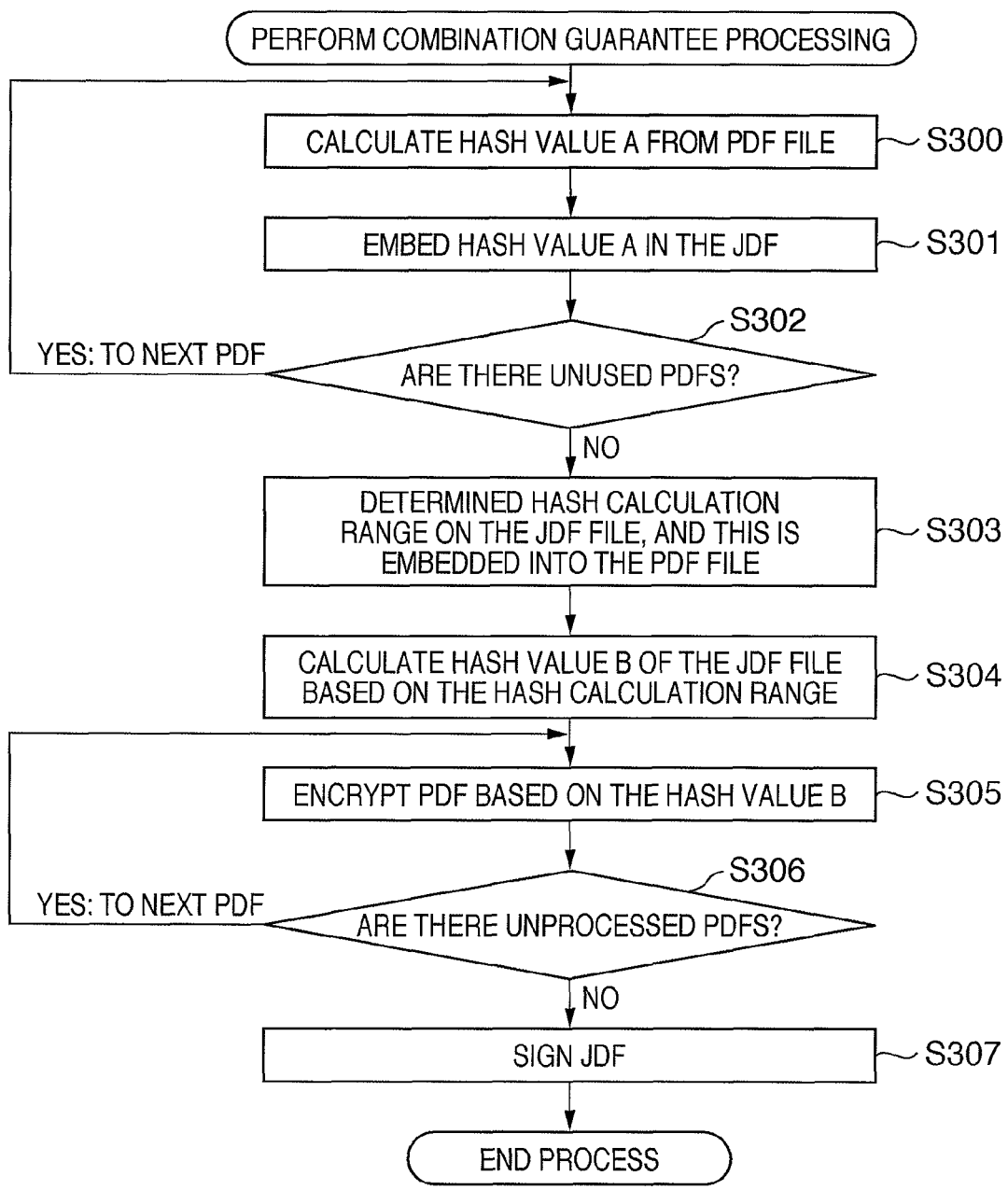
FIG. 4 is a flowchart for describing a method for guaranteeing a combination of JDF and PDF by signing a JDF file.

Next, a method for guaranteeing the combination of the JDF file and the PDF file by signing the JDF file is described, with reference mainly to FIG. 4.

In the process of S300 in FIG. 4, a hash values A is calculated for each PDF file associated with a JDF file. In the process of S301, the hash value A calculated in the process of S300 is embedded in the JDF file. A specific embedding method is described below, with reference to FIG. 10. When the hash value of the PDF file is embedded in the JDF file, it is written as a HASH attribute in a node File Spec with a URL attribute showing reference to a PDF file 1001, as shown in FIG. 10. In the example of FIG. 10, there are two PDF files, input-1.pdf and input-2.pdf, and hash values 1001a and 1001b thereof are saved in association with the respective PDF files.

Accordingly, in the process of S302, if a plurality of PDF files is referenced from the JDF file, the processes of S300 and S301 are performed on all the PDF files.

In the process of S303, the hash calculation range of the JDF file is determined, and embedded in the JDF file. Note that a description of determining the hash calculation range is given later. Below, a specific description of a method for embedding the hash calculation range in the JDF file is given.

When embedding a hash calculation range of the JDF file in the JDF file, it is written to the JDF node as a HashByteRange attribute 1101, as shown in FIG. 11. The HashByterange attribute 1101 is written as a pair of an offset value from the start of the JDF file to just before the attribute value which is not in the hash calculation range, and a length of the data from the offset value to the hash calculation application range. This pair is written in the number of sections to which the hash calculation range is applicable in the JDF file. In the example of FIG. 11, a Collate attribute 1102, which is a sort setting item, and an Amount attribute 1103, which is a setting item for the number of copies, are excluded from the hash calculation range.

A method for writing the value of the HashByteRange attribute 1101 is a method for writing attribute names of attribute values outside the hash calculation range in the JDF file, such as "Collate Amount . . . " In this case, a range excluding the attribute values for the attribute names thus written becomes the hash calculation range, when performing validation of the guarantee of the combination of the JDF file and the PDF file discussed below.

In the process of S304, the hash value B of the JDF file is calculated based on the hash calculation range. This step corresponds to a second calculating means for calculating a hash value for a JDF file.

In the process of S305, the PDF file is encrypted using the hash value B calculated as described above. The method of encryption desirably complies with PDF specifications, and the location encrypted is character string information parts of the PDF file and stream data in the content stream dictionary.

Accordingly, in the process of S306, if a plurality of PDF files is referenced from the JDF file, the process of S305 is performed on all the PDF files.

In the process of S307, the JDF file is signed. The signing method may be a common digital signature method. For example, a hash value of the JDF file is calculated, the hash value is encrypted using a secret key, and digital document data is generated. The secret key is provided from an authentication organization, etc., of digital signatures. Naturally, the public key used in validating the digital signature is received from the same organization. The hash value used in the digital signature is calculated by excluding modifiable attributes specified in the user interface in FIG. 7. In other words, it is possible to use the hash value B. For the digital signature data, it is desirable to adopt a method for embedding in the JDF file. Once the JDF file is successfully signed, the process for guaranteeing the combination of the JDF file and the PDF file is finished.

<Validating when the JDF File is Signed>

Below, a method for validating the combination of the JDF file and the PDF file when the JDF file is signed is described, with reference mainly to FIG. 5.

Figure 5:
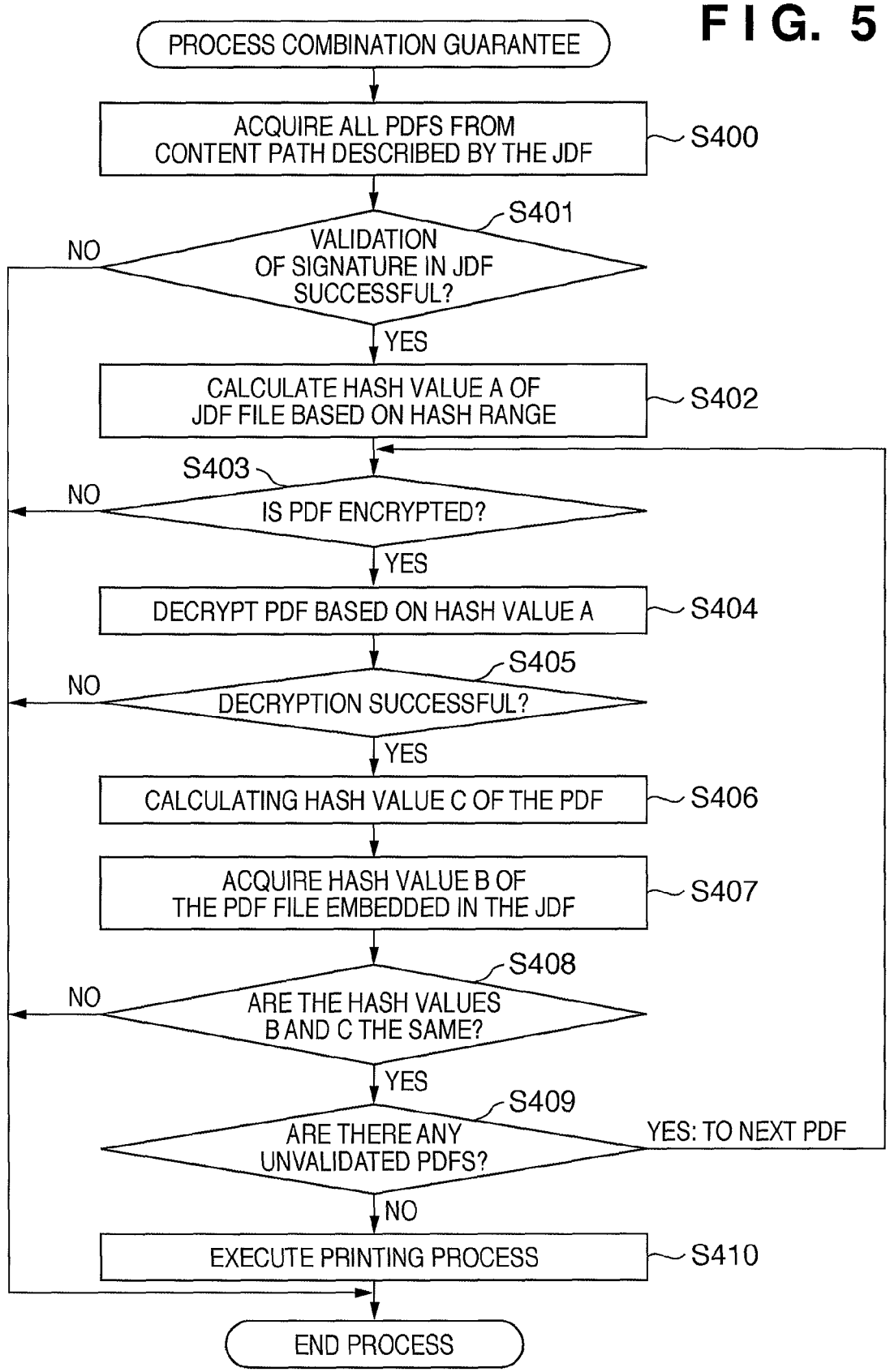
FIG. 5 is a flowchart for describing a validating method for guaranteeing a combination of a JDF file and a PDF file when the JDF file has been signed.

In the process of S400 in FIG. 5, all PDF files are acquired from the content paths described in the JDF file.

In the process of S401, a process for validating the signature of a JDF file is performed. Here, all that needs to be done is detecting alteration. The validating method may be any validating method which works with a process for signing a JDF file. For example, a hash value f the JDF file is calculated, the calculated value is compared with a hash value obtained by decrypting the embedded digital signature with a public key, and if they match, it can be deemed that no alteration has been performed. If they do not match, the process ends.

In the process of S402, the hash value A of the JDF file is calculated based on the hash calculation range written to the JDF. If the hash calculation range is written as an attribute name for which hash calculation is not performed in the JDF file, the hash value A of the JDF file is calculated for sections other than the attribute value for that attribute name. Note that if the range of the JDF used for the digital signature is the same as the range of the JDF used for calculating the hash value embedded in the JDF are the same, the hash value A will have the same value as the hash value found by validating the digital signature, thereby making it possible to use that value as the hash value A.

In the process of S403, a determination is made as to whether or not the PDF file is encrypted. As a method, a determination is made as to whether or not an Encrypt dictionary is present in the PDF file. If the PDF file is encrypted, the process moves to the process in S404. If the PDF file is not encrypted, the process ends.

In the process of S404, the PDF file is decrypted using the hash value A calculated as described above. The method for decrypting the PDF file complies with the specifications of the PDF standard common key encryption method.

In the process of S405, a determination is made as to whether or not the decryption of S404 was successful, and if so, the process moves to the process of S406. If it was not successful, the process ends.

In the process of S406, a hash value C is calculated for a PDF file which is focused on, among the PDF files associated with the JDF file. In the process of S407, a hash value B associated with the focused PDF file is acquired from among the hash values of the PDF files embedded in the JDF file. In the process of S408, the hash value B and the hash value C are compared, and it is determined whether or not they match. If they match, the process moves to the process in S409. If they do not match, the process ends.

In S409, if a plurality of PDF files are acquired in S400, the processes of S403, S404, S405, S406, S407, and S408 are performed on all the PDF files, focusing on each one in order. Once the processes are finished for all the PDF files, a printing execution process is performed (S410), and the process ends.

With the above procedure, a hash value obtained for the PDF file is embedded in the JDF file, and that value is compared with a hash value re-calculated for the PDF file. By doing this, it is possible to validate whether the set of the PDF files and the JDF file is the original set. The PDF files are encrypted using as a password the hash value generated for the JDF. By doing this, even if a print job file is downloaded by a multi-functional peripheral incapable of executing the validating procedure shown in FIG. 3, it is possible to guarantee the set of the PDF files and the JDF file.

Other Embodiments

Note that the present invention can be applied to a system constituted by a plurality of devices (e.g., a host computer, an interface device, a reader, a printer, etc.), or may be applied to an apparatus made up of a single device (e.g., a copier, a facsimile apparatus, etc.). The object of the present invention is attained by supplying a storage medium on which is recorded a program code for realizing the functionality of the above embodiments to a system or an apparatus, and a computer of the system or the apparatus reading and executing the program code stored in the storage medium. In this case, the program code itself read from the storage medium realizes the embodiments described above, and the program code itself and the storage medium storing the program code constitute the present invention.

Further, the present invention also includes cases in which all or part of the actual processes are performed by an operating system (OS) running on the computer based on instructions from the program code, and functionality of the embodiments described above is realized by these processes. Further, the present invention is also applied in a case in which the program code read from the storage medium is written to a function-expanding card inserted into the computer, or a memory provided to a function-expanding unit connected to the computer. In this case, all or part of actual processes are performed by a CPU provided to a function expanding card or to a function expanding unit, and functionality of the embodiments described above is realized by these processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2007-187601, filed Jul. 18, 2007, which is hereby incorporated by reference herein in its entirety.

What is claimed is:

1. A document output apparatus configured to output digital document data and print setting data in which the print setting data include setting parameters defining print settings for the digital document data, wherein the document data and the print setting data are associated one with the other, comprising:
a receiving unit configured to receive a designation of a setting parameter which is excluded from a range of hash calculation;
a first calculating unit configured to calculate a first hash value for the print setting data of a set which includes the digital document data and the print setting data; and
an embedding unit configured to embed the first hash value for the print setting data in the digital document data,
wherein the first calculating unit calculates the first hash value for the print setting data excluding the setting parameter designated by the designation received by the receiving unit, from among the print setting data, and
wherein the setting parameters which are designated by a user include a setting parameter for the number of printed copies and a setting parameter for sorting.

2. A document output apparatus according to claim 1, further comprising:
a second calculating unit configured to calculate a second hash value for the digital document data of the set; and
an encrypting unit configured to encrypt the digital document data using as a key the first hash value calculated by the first calculating unit and the second hash value calculated by the second calculating unit.

3. A control method for a document output apparatus configured to output digital document data and print setting data in which the print setting data include setting parameters defining print settings for the digital document data, wherein the document data and the print setting data are associated one with the other, comprising:
a receiving step of receiving a designation of a setting parameter which is excluded from a range of hash calculation;
a calculating step of calculating a hash value for the print setting data of a set which includes the digital document data and the print setting data; and
an embedding step of embedding the hash value for the print setting data in the digital document data,
wherein the calculating step calculates the hash value for the print setting data excluding the setting parameter designated by the designation received in the receiving step, from among the print setting data, and
wherein the setting parameters which are designated by a user include a setting parameter for the number of printed copies and a setting parameter for sorting.

4. A non-transitory computer-readable storage medium on which is stored a program for executing with a computer a control method for a document output apparatus configured to output digital document data and print setting data in which the print setting data include setting parameters defining print settings for the digital document data, wherein the document data and the print setting data are associated one with the other, said method comprising:
a receiving step of receiving a designation of a setting parameter which is excluded from a range of hash calculation;
a calculating step of calculating a hash value for the print setting data of a set which includes the digital document data and the print setting data; and an embedding step of embedding the hash value for the print setting data in the digital document data, wherein the calculating step calculates the hash value for the print setting data excluding the setting parameter designated by the designation received in the receiving step, from among the print setting data, and wherein the setting parameters which are designated by a user include a setting parameter for the number of printed copies and a setting parameter for sorting.

* * * * *